Figure 1:
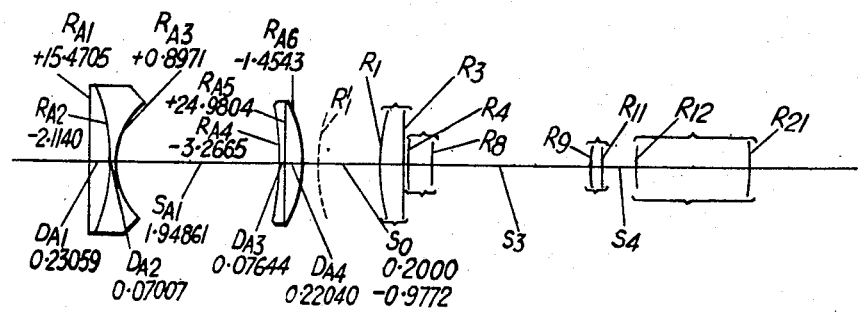

Jan. 5, 1965  G. H. COOK  3,164,664
OPTICAL SYSTEMS OF VARIABLE EQUIVALENT FOCAL LENGTH
Filed Dec. 27, 1960  2 Sheets-Sheet 1

*Inventor*
*G. H. Cook*

By
*Attorneys*

Jan. 5, 1965   G. H. COOK   3,164,664
OPTICAL SYSTEMS OF VARIABLE EQUIVALENT FOCAL LENGTH
Filed Dec. 27, 1960   2 Sheets-Sheet 2

Inventor
G. H. Cook
By
Holcomb, Wetherill & Brisebois
Attorneys 3,164,664
OPTICAL SYSTEMS OF VARIABLE EQUIVALENT
FOCAL LENGTH
Gordon Henry Cook, Leicester, England, assignor to Rank
Precision Industries Limited, trading as The Rank Organisation Rank Taylor Hobson Division, Leicester, England, a British company
Filed Dec. 27, 1960, Ser. No. 78,744
Claims priority, application Great Britain, Jan. 1, 1960,
11 Claims. (Cl. 88—57)

This invention relates to a variable focal length optical system for projecting an image of an object on to a generally rectangular image-receiving area in a stationary image plane, for example for use in a television camera or a cinematograph camera, the system being of the type commonly known as the "zoom" type, that is one having relatively movable members whereby the equivalent focal length of the system can be varied whilst maintaining constant position of the resultant image plane of the system throughout the range of relative movement. Known optical objectives of this type frequently have front and rear assemblies, of which the front assembly includes the relatively movable members and the rear assembly is stationary.

It should be made clear that the terms "front" and "rear" are herein used, in accordance with the usual convention to relate to the sides of the objective respectively nearer to and further from the longer conjugate.

Convenience in practical use of such a system calls for a number of exacting requirements, which are difficult to fulfill simultaneously. For instance, in order to make the system readily adaptable to different conditions of use, it is often desired so to arrange the system as to provide two (or more) different ranges of variation of the equivalent focal length. This can be achieved for example by providing two (or more) interchangeable stationary rear assemblies for use with the same front assembly, such rear assemblies being so chosen as to maintain the same position of the resultant image plane without necessity for changing the position of the front assembly.

Another desirable practical requirement is so to arrange the system as to provide a long back focal distance between the rear surface of the rear assembly and the resultant image plane, in order to provide adequate space for accommodating filter devices or reflectors or other pieces of apparatus between the objective and the focal plane. Such long back focal distance is readily obtainable when the values of the equivalent focal length in the range of variation are high relatively to the size of the rectangular image-receiving area, but the majority of variable focal length objectives have back focal distances, inadequate for such purposes, with lower values of equivalent focal length in the range of variation.

In one proposal for meeting a similar difficulty in a colour camera arrangement employing a group of alternative objectives of different equivalent focal lengths mounted on a turret, space for accommodating the colour filters and beam-splitting devices for transmitting the colour partial images to the three image-receiving devices is afforded by means of a copying objective behind the primary image plane of the objective for relaying the image therefrom to the secondary image plane of the three image-receiving devices, a field lens being provided in the primary image plane for forming an image of the diaphragm of the main objective in the entrance pupil of the copying objective. If such a relaying system were applied to an objective of the zoom type, it would have the disadvantage of giving an inconveniently large overall axial length to the complete system, and in addition the necessity for using a field lens as well as a copying objective would very seriously interfere with satisfactory aberration correction of the complete system.

Another complication arises from the fact that objectives of the zoom type, and especially those providing two ranges of variation of the equivalent focal length, are suitable primarily for outdoor work where the object distance is usually relatively large. A further desirable feature is therefore so to arrange the system as to make it suitable for use not only for outdoor work but also for studio work necessitating provision for shorter object distances and a wider angle of view.

The present invention has for its object to provide an improved optical system incorporating an objective of the zoom type, whether providing for a single range or two or more ranges of variation of equivalent focal length, wherein the system can readily be adapted for use either with relatively large object distances or with the relatively short object distances and wide angles of view required for studio work, whilst maintaining in all cases an adequately long back focal distance.

According to the present invention, a variable focal length optical system for projecting an image of an object on to a generally rectangular image-receiving area in a stationary image plane, comprises an objective of variable equivalent focal length, the minimum value $F_0$ of which is not greater than 4 times the length of the diagonal of the image-receiving area, and having front and rear assemblies, of which the front assembly includes members relatively movable for effecting variation of the equivalent focal length of the objective whilst maintaining the resultant image position always in the stationary image plane throughout the range of relative movement, whilst the rear assembly has an inverted telephoto characteristic with effective axial beam diameter greater at its rear surface than at its front surface and includes a stationary convergent rear member having equivalent focal length $f_r$ and in front thereof at least one member which cooperates with the front assembly to form a divergent group whose equivalent focal length bears to the equivalent focal length of the complete objective a constant ratio lying between $-f_r/F_0$ and $-f_r/3F_0$, such divergent group acting to produce a virtual image of the object in a constant position lying between $f_r$ and $4f_r$ in front of the front surface of the converging rear member, whereby such rear member always receives a divergent beam and forms from such virtual image a resultant image of the object at a back focal distance behind the rear surface of the convergent rear member greater than 6 times the length of the diagonal of the image-receiving area, and a wide angle attachment which can be placed at will in front of the front assembly of the objective for increasing the angular field and decreasing the values of the equivalent focal length of the objective in accordance with the telescopic power of the attachment without reducing the back focal distance of the objective.

Preferably, in the mid-position of the relative movements, that is in the position in which the value of the equivalent focal length of the objective is equal to the geometric mean between its minimum and maximum values, the axial separation of the rear nodal point of the divergent group in front of the rear convergent member of the rear assembly from the front nodal point of such rear member lies between $+f_r$ and $-f_r/3$, such axial separation being reckoned positive if the rear nodal point of the divergent group lies in front of the front nodal point of the rear member and negative if the said rear nodal point lies behind the said front nodal point.

A preferred construction for the objective is that forming the subject of the present applicant's copending United States patent application U. S. Patent No. 3,081,671. In such objective, the rear assembly comprises a stationary front member, a stationary convergent rear member, and a divergent middle member adjustable from one to the other of two preset positions in which such middle member has the same conjugates, whereby in such two preset positions of the middle member the relative movement of the members of the front assembly will produce two different ranges of variation of the equivalent focal length of the complete objective with the same position of the resultant image plane, the magnifications of the divergent middle member of the rear assembly in its two preset positions being respectively $\sqrt{M}$ and $1/\sqrt{M}$, where M is the ratio between the equivalent focal lengths of the objective in the two ranges. It should be made clear that with this arrangement the rear assembly has an inverted telephoto characteristic for the lower of the two ranges of variation of equivalent focal length and a telephoto characteristic for the higher range.

The wide angle attachment is preferably substantially afocal. It is preferred to mount the attachment, when in use, in a constant position, focussing of the objective for different object distances being effected by movement of at least one member of the objective independently of the relative movement for effecting variation of the equivalent focal length.

It is desirable to make the attachment as small and light as possible, without however introducing objectionable aberrations or light absorption, and in one convenient construction the attachment comprises a divergent member axially spaced in front of a convergent member. In this case, in order to satisfy the afocal condition, the separation between the adjacent nodes of the two members should be equal to the difference between the positive values of their equivalent focal lengths. Preferably, the divergent front member includes a convergent element and at least one divergent element and the convergent rear member includes at least one convergent element behind a divergent element.

Since it is desirable, in order to reduce the size of the objective as far as possible, so to arrange the objective as to give satisfactory characteristics as regards vignetting whilst keeping the clear diameter of the front surface of the objective no larger than is required for the axial beam alone, the clear diameter of the rear surface of the attachment should be sufficiently greater than that of the front surface of the objective to permit the oblique beams to pass. For this purpose, the clear diameter of the rear surface of the convergent rear member of the attachment preferably lies between 1.0 and 1.25 times the ratio of the maximum value of the equivalent focal length of the objective to the $f$/number of the objective. The equivalent focal length of such rear member preferably lies between 2.5 and 5.0 times such ratio.

In order to assist in maintaining good aberration correction throughout a wide range of object distances, whilst avoiding undesirably thick components, it is desirable for the convergent rear member of the attachment to consist of a doublet having a divergent element in front of a convergent element and for the rear surface of such doublet to be concave to the front with radius of curvature between 0.2 and 0.5 times the equivalent focal length of such rear member, the internal contact in such doublet component having radius of curvature greater than two times such equivalent focal length.

The divergent front member of the attachment may consist of a doublet having a convergent element in front of a divergent element, the rear surface of such doublet being convex to the front with radius of curvature between 0.25 and 0.6 times the equivalent focal length of such front member. The internal contact in such doublet is preferably concave to the front with radius of curvature between 0.5 and 2.0 times the equivalent focal length of the front member, the mean refractive index of the material of the convergent front element thereof exceeding that of the divergent rear element by between 0.1 and 0.25. These features contribute towards good correction for distortion in the attachment and also help towards keeping the size of the attachment relatively small.

Conveniently, in such case the internal contact in the doublet component of the rear member of the attachment, whether convex or concave to the front, has radius of curvature greater than 2.0 times the equivalent focal length of such member, the mean refractive index of the material of the divergent front element thereof exceeding that of the convergent rear element by between 0.05 and 0.20.

Preferably, in each of the two doublet components of the attachment, the Abbé V number of the material of the rear element exceeds that of the front element by at least 20. This assists in avoiding the use of relatively thick and powerful components.

Although the divergent front member of the attachment may consist of a doublet alone, it become possible, with a somewhat more complex front member to reduce the axial separation betwen the two members for similar values of their equivalent focal lengths. Thus, the overall length is reduced and the front member can cover similar beam diameters and angular fields with a smaller diameter. For this purpose, the divergent front member may comprise a simple divergent component spaced in front of a doublet component having a convergent element in front of a divergent element, both components being of meniscus form with their surfaces convex to the front. Preferably, the front surface of such doublet component has a radius of curvature greater than the equivalent focal length of the front member and less than twice such equivalent focal length, and the internal contact in such doublet component is concave to the front with radius of curvature between 1.67 and 5 times such equivalent focal length, whilst the axial thickness of the front element of such doublet component lies between .05 and .15 times such equivalent focal length. The arithmetic mean of the Abbé V numbers of the materials of the divergent elements in the front member preferably exceeds the Abbé V number of the material of the convergent element therein by at least 20, the mean refractive index of the material of the front element of the doublet component exceeding that of the rear element thereof by at least .16.

In such case, preferably, for providing good correction for oblique aberrations, the radius of curvature of the rear surface of the front component of the front member bears to that of the front surface of the doublet component of such member a ratio lying between .3 and .6, and the axial length of the air space between such surfaces lies between .05 and .15 times the equivalent focal length of the front member. Further, for providing good correction for higher order axial aberrations, the radii of curvature of the front and rear surfaces of the divergent front member preferably lie respectively between .75 and 1.75 and between .4 and .6 times the equivalent focal length of such front member. These features, although primarily provided respectively for oblique aberration correction and for higher order axial aberration correction, also cooperate together for assisting in primary aberration correction.

It should be made clear that the term "internal contact," when used herein in connection with a compound component, is to be understood as including, not only a cemented internal contact surface, but also what is often known as a "broken contact," that is an arrangement in which the two contacting surfaces have slightly different radii of curvature. In such case, the effective radius of curvature of the broken contact is the arithmetic mean between the radii of curvature of the two constituent surfaces, and the effective power thereof is the harmonic mean between the powers of the two surfaces.

Figure 2:
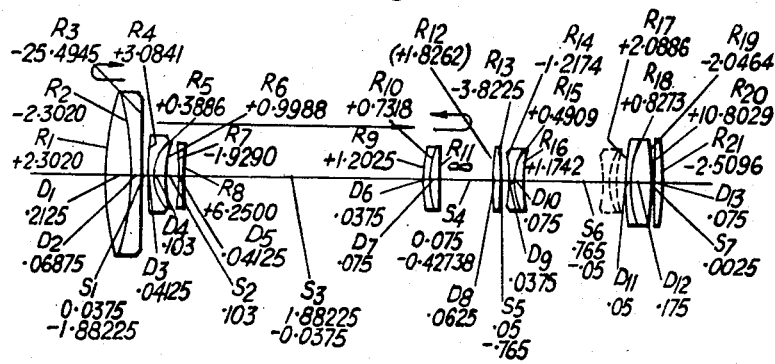
Figure 3:
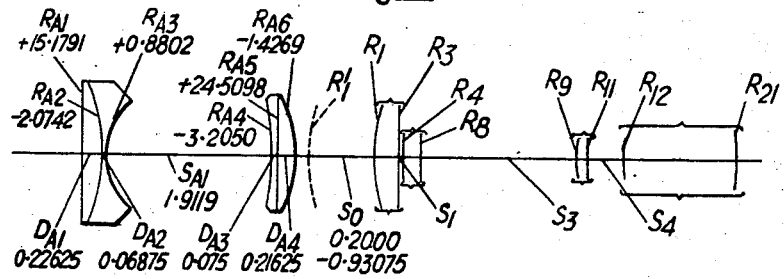
Figure 4:
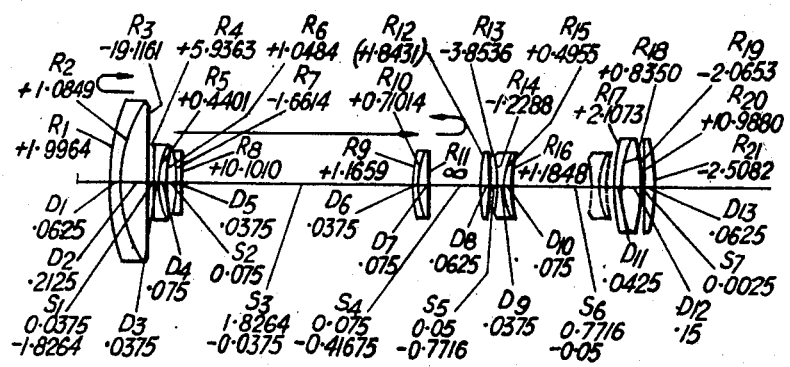
Figure 5:
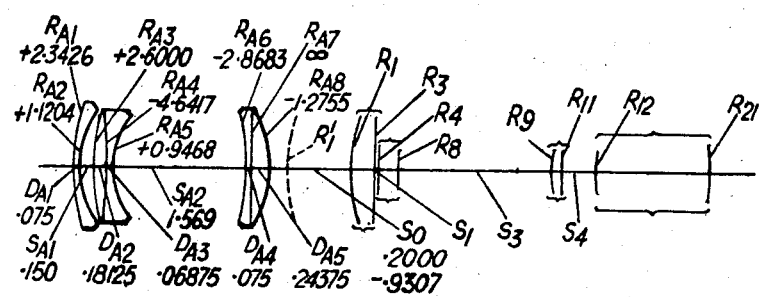

The invention may be carried into practice in various ways, but three convenient practical constructions of variable focal length objective according thereto are illustrated by way of example in the accompanying drawings, in which FIGURES 1 and 2 illustrate the first construction, FIGURE 2 showing the objective itself, whilst FIGURE 1 on a smaller scale shows the objective diagrammatically with the wide angle attachment in position in front thereof, FIGURES 3 and 4 are similar views of the second construction, and FIGURE 5 is a view similar similar to FIGURE 3 showing the same objective with a different construction of wide angle attachment.

Numerical data for the examples shown in these three constructions are given in the following tables, in which $R_1$, $R_2$ ... represent the radii of curvature of the individual surfaces of the system, the positive sign indicating that the surface is convex to the front and the negative sign that it is concave thereto, $D_1$, $D_2$ ... represent the axial thickness of the elements of the system, and $S_1$, $S_2$ ... represent the axial air separations between the components of the system. The suffix A is utilised to distinguish the radii and axial distances in the wide angle attachment from those in the objective itself. The tables also give the mean refractive indices $n_d$ for the $d$-line of the spectrum and the Abbé V numbers of the materials used for the various elements of the system, and in addition the clear diameters for the air-exposed surfaces of the system.

The insertion of equals (=) signs in the radius columns of the tables, in company with plus (+) and minus (−) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

It should be mentioned that the objectives included in the systems in these examples incorporate the inventions of the present applicant's copending United States of America patent application Serial No. 53,413 and U.S. Patent No. 3,081,671, and are in fact identical with examples given in the specifications of such applications.

Example I

| Radius | Thickness or Air Separation | Refractive Index $n_d$ | Abbé V Number | Clear Diameter |
|---|---|---|---|---|
| $R_{A1}=+15.4705$ | | | | 1.704 |
| | $D_{A1}=0.23059$ | 1.70035 | 30.28 | |
| $R_{A2}=-2.1140$ | | | | |
| | $D_{A2}=0.07007$ | 1.51899 | 60.42 | |
| $R_{A3}=+0.8971$ | | | | 1.310 |
| | $S_{A1}=1.94861$ | | | |
| $R_{A4}=-3.2665$ | | | | 1.379 |
| | $D_{A3}=0.07644$ | 1.70035 | 30.28 | |
| $R_{A5}=+24.9804$ | | | | |
| | $D_{A4}=0.22040$ | 1.61342 | 59.27 | |
| $R_{A6}=-1.4543$ | | | | 1.433 |
| | $S_0$ =variable | | | |
| $R_1$ =+2.3020 | | | | 1.274 |
| | $D_1$ =.2125 | 1.65695 | 50.81 | |
| $R_2$ =−2.3020 | | | | |
| | $D_2$ =.06875 | 1.7618 | 26.98 | |
| $R_3$ =−25.4945 | | | | 1.221 |
| | $S_1$ =variable | | | |
| $R_4$ =+3.0841 | | | | .603 |
| | $D_3$ =.04125 | 1.691 | 54.80 | |
| $R_5$ =+.3886 | | | | |
| | $D_4$ =.103 | 1.674 | 32.00 | |
| $R_6$ =+.9988 | | | | .534 |
| | $S_2$ =.103 | | | |
| $R_7$ =−1.9290 | | | | .516 |
| | $D_5$ =.04125 | 1.691 | 54.80 | |
| $R_8$ =+6.2500 | | | | .511 |
| | $S_3$ =variable | | | |
| $R_9$ =+1.2025 | | | | .524 |
| | $D_6$ =.0375 | 1.7618 | 26.98 | |
| $R_{10}$ =+.7318 | | | | |
| | $D_7$ =.075 | 1.5097 | 64.44 | |
| $R_{11}$ ∞ | | | | .518 |
| | $S_4$ =variable | | | |
| $R_{12}$ aspheric | | | | .518 |
| | $D_8$ =.0625 | 1.48503 | 70.29 | |
| $R_{13}$ =−3.8225 | | | | .514 |
| | $S_5$ =.05 or .765 | | | |
| $R_{14}$ =−1.2174 | | | | .508 |
| | $D_9$ =.0375 | 1.65695 | 50.81 | |
| $R_{15}$ =+.4909 | | | | |
| | $D_{10}$ =.075 | 1.7618 | 26.98 | |
| $R_{16}$ =+1.1742 | | | | .513 |
| | $S_6$ =.765 or .05 | | | |
| $R_{17}$ =+2.0886 | | | | .742 |
| | $D_{11}$ =.05 | 1.7618 | 26.98 | |
| $R_{18}$ =+.8273 | | | | |
| | $D_{12}$ =.175 | 1.61334 | 57.59 | |
| $R_{19}$ =−2.0464 | | | | .748 |
| | $S_7$ =.0025 | | | |
| $R_{20}$ =+10.8029 | | | | .745 |
| | $D_{13}$ =.075 | 1.5097 | 64.44 | |
| $R_{21}$ =−2.5096 | | | | .743 |

The aspheric surface $R_{12}$ has radius of curvature $+1.8262$ at the vertex and is defined by the equation:

$$x=(1.8262-\sqrt{3.3348-y^2})-.004135y^4+.2330y^6-.2541y^8+8.9889y^{10}$$

The dimensions of the variable air spaces in the front assembly of the objective are as follows:

| | $S_1$ | $S_3$ | $S_4$ |
|---|---|---|---|
| $F=F_0$ | .0375 | 1.88225 | .42738 |
| $F=\sqrt{F_0 F_m}$ | 1.31225 | 1.31225 | .075 |
| $F=F_m$ | 1.88225 | .0375 | .42738 |

The dimensions of the variable air space $S_0$ between the wide angle attachment and the objective are as follows:

| | ∞ Object Distance | Minimum Object Distance |
|---|---|---|
| $F=F_0$ | 0.9772 | 0.5524 |
| $F=\sqrt{F_0 F_m}$ | 0.6249 | 0.2000 |
| $F=F_m$ | 0.9772 | 0.5524 |

Example II

| Radius | Thickness or Air Separation | Refractive Index $n_d$ | Abbé V Number | Clear Diameter |
|---|---|---|---|---|
| $R_{A1}=+15.1791$ | $D_{A1}=.22625$ | 1.70035 | 30.28 | 1.672 |
| $R_{A2}=-2.0742$ | $D_{A2}=.06875$ | 1.51899 | 60.42 | |
| $R_{A3}=+0.8802$ | $S_{A1}=1.9119$ | | | 1.285 |
| $R_{A4}=-3.2050$ | $D_{A3}=.075$ | 1.70035 | 30.28 | 1.353 |
| $R_{A5}=+24.5098$ | $D_{A4}=.21625$ | 1.61342 | 59.27 | |
| $R_{A6}=-1.4269$ | $S_0$ =variable | | | 1.406 |
| $R_1=+1.9964$ | $D_1=.0625$ | 1.7618 | 26.98 | 1.25 |
| $R_2=+1.0849$ | $D_2=.2125$ | 1.6177 | 49.78 | |
| $R_3=-19.1161$ | $S_1$ =variable | | | 1.205 |
| $R_4=+5.9363$ | $D_3=.0375$ | 1.691 | 54.80 | .578 |
| $R_5=+.4401$ | $D_4=.075$ | 1.7174 | 29.51 | |
| $R_6=+1.0484$ | $S_2=.075$ | | | .522 |
| $R_6+-1.6614$ | $D_5=.0375$ | 1.691 | 54.80 | .514 |
| $R_8=+10.1010$ | $S_3$ =variable | | | .518 |
| $R_9=+1.1659$ | $D_6=.0375$ | 1.7618 | 26.98 | .528 |
| $R_{10}=+.71014$ | $D_7=.075$ | 1.5097 | 64.44 | |
| $R_{11}$ ∞ | $S_4$ =variable | | | .522 |
| $R_{12}$ aspheric | $D_8=.0625$ | 1.48503 | 70.29 | .522 |
| $R_{13}=-3.8536$ | $S_5=.05$ or $.7716$ | | | .518 |
| $R_{14}=-1.2288$ | $D_9=.0375$ | 1.65695 | 50.81 | .512 |
| $R_{15}=+.4955$ | $D_{10}=.075$ | 1.7618 | 26.98 | |
| $R_{16}=+1.1848$ | $S_6=.7716$ or $.05$ | | | .517 |
| $R_{17}=+2.1073$ | $D_{11}=.0425$ | 1.7618 | 26.98 | .748 |
| $R_{18}=+.8350$ | $D_{12}=.15$ | 1.61334 | 57.59 | |
| $R_{19}=-2.0653$ | $S_7=.0025$ | | | .751 |
| $R_{20}=+10.9880$ | $D_{13}=.0625$ | 1.5097 | 64.44 | .749 |
| $R_{21}=-2.5082$ | | | | .747 |

The aspheric surface $R_{12}$ has radius of curvature $+1.8431$ at the vertex and is defined by the equation:

$$x=(1.8431-\sqrt{3.3970-y^2})-.01782y^4 +.2107y^6+.8772y^8-1.8819y^{10}$$

The dimensions of the variable air spaces in the front assembly of the objective are as follows:

| | $S_1$ | $S_3$ | $S_4$ |
|---|---|---|---|
| $F=F_0$ | .0375 | 1.8264 | .41675 |
| $F=\sqrt{F_0 F_m}$ | 1.2736 | 1.2736 | .075 |
| $F=F_m$ | 1.8264 | .0375 | .41675 |

The dimensions of the variable air space $S_0$ between the wide angle attachment and the objective are as follows:

| | ∞ Object Distance | Minimum Object Distance |
|---|---|---|
| $F=F_0$ | .93075 | .5415 |
| $F=\sqrt{F_0 F_m}$ | .58925 | .20 |
| $F=F_m$ | .93075 | .5415 |

Example III

| Radius | Thickness or Air Separation | Refractive Index $n_d$ | Abbé V Number | Clear Diameter |
|---|---|---|---|---|
| $R_{A1}=+2.3426$ | $D_{A1}=.075$ | 1.61342 | 59.27 | 1.524 |
| $R_{A2}=+1.1204$ | $S_{A1}=.150$ | | | 1.381 |
| $R_{A3}=+2.6000$ | $D_{A2}=.18125$ | 1.7283 | 28.66 | 1.380 |
| $R_{A4}=-4.6417$ | $D_{A3}=.06875$ | 1.51507 | 56.35 | |
| $R_{A5}=+0.9468$ | $S_{A2}=1.569$ | | | 1.185 |
| $R_{A6}=-2.8683$ | $D_{A4}=.075$ | 1.7283 | 28.66 | 1.343 |
| $R_{A7}$ ∞ | $D_{A5}=.24375$ | 1.61342 | 59.27 | |
| $R_{A8}=-1.2755$ | $S_0$ =variable | | | 1.410 |

The objective behind this wide angle attachment is identical with that set out above in the table of Example II, and the dimensions of the variable air space $S_0$ between the attachment and the objective are also the same as in Example II.

In these tables, all the linear dimensions are given in terms of $F_0$, the minimum value of the equivalent focal length F of the objective in its lower range of variation. The maximum value $F_m$ in such lower range is $5F_0$, and the minimum and maximum values $F_0^1$ and $F_m^1$ in the higher range are respectively $2F_0$ and $10F_0$.

The relative aperture of the objective is $f/4.0$ for the lower range and $f/8.0$ for the higher range.

The objective alone in both examples covers a semi-angular field varying from 11½ degrees at minimum focal length $F_0$ to 2½ degrees at maximum focal length $F_m$ in the lower range, and from 5¾ degrees at minimum focal length $F_0^1$ to 1¼ degrees at maximum focal length $F_m^1$ in the higher range.

The iris diaphragm is located .025 in front of the surface $R_{12}$ in the examples and has diameter $.518F_0$ in Example I and $.522F_0$ in Example II. The back focal distance is $2.908F_0$ in Example I and $2.929F_0$ in Example II.

In these examples, in accordance with the invention forming the subject of the copending application Serial No. 53,413 above-mentioned, the front assembly of the objective is substantially afocal throughout the range of movement and comprises three members, of which the front and rear members are convergent and are mechanically interconnected to perform approximately equal and opposite axial movements under the control of a cam mechanism actuated by a zoom control element, whilst the middle member is divergent and is caused to perform an axial movement which bears an approximately linear relationship to the movement of the zoom control element, the movement of the middle member and the movements of the front and rear members being so interrelated as to cause the equivalent focal length of the objective to vary in accordance with an approximately logarithmic law relatively to the movement of the zoom control element. With such approximately logarithmic law, the size of the resultant image in the stationary image plane of the objective changes at a relatively steady rate in accordance with the movement of the zoom control element.

The front and rear members of the front assembly in the examples each consists of a convergent doublet component, and the middle member consists of a divergent doublet component followed by a convergent simple component. The movements of these members under the control of the zoom control element are fully described in the specification of such copending application, the divergent middle member being steadily driven at a linear rate in a rearward direction during the change from minimum to maximum equivalent focal length, whilst at the same time the front and rear members are driven by the zoom control element through a single cam so that they first move away from one another and then move back again to their starting positions. The total travel of the divergent middle member is $1.85F_0$ in Example I and $1.79F_0$ in Example II. Since the movements of the front and rear members are equal and opposite, they will exert balanced reactive forces on the cam, thus relieving the cam of the strain of unbalanced forces. Since further their maximum movement is small, namely about $.35F_0$ in Example I and $.34F_0$ in Example II, they do not require steep slopes in the cam throughout the movement.

So far it has been assumed that the object position remains stationary, for example at infinity. Focussing for near object positions is effected by means of an additional forward movement of the front member of the front assembly under the control of a focussing control element, independently of the zooming movement, for example by mounting the front member adjustably in its mount. If $d_0$ is the distance of the object from the front nodal plane of the front member when the wide angle attachment is not in use, the necessary further adjustment of the front member for focussing purposes consists of a forward movement through a distance equal to $$f_1^2/(d_0-f_1)$$

where $F_1$ is the equivalent focal length of the front member. The minimum object distance which can be satisfactorily accommodated by these examples, when the wide angle attachment is not in use, is of the order of $36F_0$, and provision is made for a maximum focussing movement of about $.43F_0$ in Example I and $.39F_0$ in Example II to provide for such object distance, the equivalent focal length $f_1$ of the front member of the front assembly having the values $+3.704F_0$ in Example I and $+3.553F_0$ in Example II. The equivalent focal lengths $f_2$ and $f_3$ respectively of the middle and rear members of the front assembly are $-1.031F_0$ and $+3.405F_0$ in Example I and $-1.000F_0$ and $+3.289F_0$ in Example II.

The rear assembly of the objective in both examples comprises a stationary front member, an adjustable middle member, and a stationary rear member. The front member consists of a convergent simple component having an aspheric front surface and has equivalent focal length $f_f$ equal to $+2.557F_0$ in Example I and $+2.580F_0$ in Example II. The adjustable middle member consists of a divergent doublet component having equivalent focal length $f_m$ equal to $-1.011F_0$ in Example I and $-1.020F_0$ in Example II. The stationary rear member consists of a convergent doublet component followed by a convergent simple component, and has equivalent focal length $f_r$ equal to $+1.399F_0$ in Example I and $+1.403F_0$ in Example II. The divergent middle member is adjustable from one of two preset positions, in which it has the same conjugates, the movement being $0.715F_0$ in Example I and $0.721F_0$ in Example II, the magnifications of the middle member in the two positions being 1.414 and 0.707 in both examples. In this way, the complete objective has two ranges of variation of its equivalent focal length respectively from $F_0$ to $5F_0$ and from $2F_0$ to $10F_0$. The rear assembly and its operation are fully described in the specification of the copending application No. 42,941 above-mentioned.

This rear assembly when adjusted for the lower of the two ranges has an inverted telephoto characteristic whilst when adjusted for the higher range it has a telephoto characteristic. The effective axial beam diameter in the rear assembly is much greater at its rear surface than at its front surface, as will be clear from the tables above given. The arrangement is such that the stationary rear member of the rear assembly always receives a divergent beam in both positions of adjustment of the middle member and throughout the zooming movements in the front assembly. Thus the front and middle members of the rear assembly can be regarded as cooperating with the front assembly to constitute a divergent group, whose equivalent focal length varies during the zooming movement but bears a constant ratio to the equivalent focal length of the complete objective, this ratio being .880 in Example I and .879 in Example II. These ratios are the same for both ranges of variation. This divergent group produces a virtual image of the object in a constant position lying at a distance in front of the front surface of the stationary rear member equal to $2.5171F_0$ in Example I and $2.5398F_0$ in Example II.

The rear nodal point of this divergent group varies in position during the zooming movement. In the lower range of variation of the equivalent focal length, the position of this nodal point varies in Example I from $.872F_0$ in front of the rear surface of the group (that is the rear surface of the middle member of the rear assembly) at the lower end of the range to $2.647F_0$ behind such rear surface at the upper end of the range, the position at the mid-point of the range (that is when the value of the equivalent focal length of the objective is the geometric mean between the minimum and maximum values, this being the point in the range at which the front and rear members of the front assembly are furthest apart from one another) being $.215F_0$ behind the said rear surface. The corresponding positions of this nodal point in Example II are $.889F_0$ in front of the rear surface at the minimum end of the range, $2.629F_0$ behind the rear surface at the maximum end of the range, and $.198F_0$ behind the rear surface at the mid-point of the range.

The front nodal point of the rear member of the rear assembly is at a position $.113F_0$ in Example I and $.096F_0$ in Example II behind the front surface of such rear member. Thus, allowing for the axial separation between such front surface and the rear surface of the middle member of the rear assembly, namely $.765F_0$ in Example I and $.772F_0$ in Example II, the axial separation between the rear nodal point of the divergent group and the front nodal point of the rear member of the rear assembly at the mid-point of the lower range of variation amounts to $.663F_0$ in Example I and .670 in Example II.

As is fully explained in the specifications of the copending applications above mentioned, the objective in these two examples is well-corrected throughout the two ranges of variation of the equivalent focal length for all the aberrations and has a long back focal distance amounting to $2.908F_0$ in Example I and $2.929F_0$ in Example II. Since the primary advantage of such long back focal distance is to provide adequate accommodation for filters or reflectors or other equipment between the rear surface of the objective and the resultant image plane, it is the absolute value of such back focal distance, in relation to the size of the image-receiving area in the image plane, that is of chief importance. A desired back focal distance can of course always be obtained by scaling up the equivalent focal length of the objective, but it is clearly of no interest in practice to increase the equivalent focal length values too much in relation to the size of the image-receiving area, and a practical limit in this respect may be specified, namely that the minimum value of equivalent focal length should not be greater than four times the length of the diagonal of the image-receiving area.

Thus, in a practical instance, with an image-receiving area having a diagonal of 1.6 inches, very satisfactory results for a variety of practical purposes can be obtained with the objective in the above two examples, without using the wide angle attachment, if $F_0$ is chosen to be, say, 4 inches, thus giving two ranges of variation of the equivalent focal length from 4 to 20 inches and from 8 to 40 inches, the back focal distance then being 11.6 inches in Example I and 11.7 inches in Example II. In such case, a range of object distances from infinity down to about 12 feet can be satisfactorily covered, and this is usually amply sufficient for outdoor photography and also for much studio photography. To be fully satisfactory for the full range of studio photography, however, including "close ups," it is desirable to be able to get down to object distances as low as 3 feet, and the present invention enables this to be effected fully satisfactorily by the provision of a wide angle attachment which can be mounted in front of the objective when such shorter object distances are required. By using a wide angle attachment with a telescopic power of 2, it becomes possible to obtain four ranges of variation of the overall equivalent focal length of the complete optical system, namely two ranges respectively from 4 to 20 inches and from 8 to 40 inches without the attachment and two ranges from 2 to 10 inches and from 4 to 20 with the attachment. The range from 4 to 20 inches without the attachment has a relative aperture $f/4.0$ and gives a minimum object distance of 12 feet, whilst the similar range from 4 to 20 inches with the attachment has relative aperture $f/8.0$ and can focus down to an object distance of 30 inches, thus giving two settings with the same focal length range but with different operational advantages.

The tables above given for the three examples include the numerical data for wide angle attachments suitable for use with the objectives above described. In all three examples, the wide angle attachment is afocal and is mounted in a stationary position sufficiently far in front of the objective to allow for the maximum movement of the front member of the front assembly both for zooming and for focussing. It will be seen from the last portion of each table that when such front member is nearest to the attachment the rear surface of the attachment is separated by $.20F_0$ from the front surface of the front member.

As has been mentioned, it is convenient to give the attachment a telescopic power of 2. This has the effect of giving to the complete optical system equivalent focal lengths half those of the objective alone and also angles of view twice those of the objective alone.

In Examples I and II, the attachment consists of a divergent front member in the form of a doublet component spaced in front of a convergent rear member also in the form of a doublet component, whilst in Example III the divergent front member consists of a simple component in front of a doublet component and the convergent rear member consists of a doublet component. For the afocal condition, the separation between the adjacent nodes of the two members must be equal to the difference between their equivalent focal lengths, which are in Example I respectively for the front member and for the rear member $-2.2677F_0$ and $+4.5354F_0$, the corresponding figures for Example II being $-2.225F_0$ and $+4.45F_0$, and those for Example III $-1.9940F_0$ and $+3.9880F_0$.

Focussing for object distances is still effected by movement of the front member of the front assembly of the objective. When the objective is focussed for infinity the beam between the attachment and the objective is collimated, so that the beam in front of the attachment must also be collimated and the complete system therefore remains focussed for infinity. When, however, the front member of the front assembly is moved forward to focus on a nearer distance, the beam behind the attachment has the corresponding degree of divergence and owing to the convergence of the rear member of the attachment the beam between the two members of the attachment is more strongly divergent. The front member of the attachment is, however, not strong enough to restore the original degree of divergence, so that the object distance for the complete system corresponding to a given focussing movement of the front member of the front assembly is shorter than that corresponding to the same focussing movement when the attachment is not in use. The equation defining the new object distance when the attachment is in use is $$D_A = [D_0(p-1) - f_{A2}]/p^2$$

where $D_A$ is the new object distance measured from the front node of the front member of the attachment, $D_0$ is the original object distance for the objective alone measured from the stationary position of the rear node of the rear member of the attachment, $p$ is the telescopic power of the attachment and $f_{A2}$ is the equivalent focal length of the rear member of the attachment. Thus, for example, when the front member of the front assembly of the objective has been moved forward to the position of minimum object distance, $D_0$ is equal to $36F_0$, which as mentioned above corresponds to 12 feet when $F_0$ is 4 inches. Since $p=2$ in each example and $f_{A2}$ is $+4.5354F_0$ in Example I, $+4.45F_0$ in Example II and $+3.9880F_0$ in Example III, $D_A$ becomes $7.87F_0$ in Example I, $7.88F_0$ in Example II and $8.00F_0$ in Example III, that is 31 or 32 inches when $F_0=4$ inches.

As has been mentioned, the maximum value of the equivalent focal length of the objective is $5F_0$ for the lower range having relative aperture $f/4.0$ or $10F_0$ for the upper range with relative aperture $f/8.0$. Thus, the ratio of maximum equivalent focal length to the $f$/number is $1.25F_0$. The clear diameter of the rear surface of the attachment is $1.433F_0$ or $1.143$ times such ratio in Example I, $1.406F_0$ or $1.125$ times such ratio in Example II, and $1.410F_0$ or $1.128$ times such ratio in Example III. The equivalent focal length $f_{A2}$ of the rear member of the attachment is $3.628$ times such ratio in Example I, $3.56$ times such ratio in Example II, and $3.19$ times such ratio in Example III.

The convergent rear member of the attachment in all three examples consists of a doublet having a divergent element in front of a convergent element. The rear surface of such doublet is concave to the front with radius of curvature $0.32f_{A2}$ in all three examples. The internal contact surface is slightly convex to the front with radius of curvature $5.5f_{A2}$ in Examples I and II and is plane in Example III. The two elements are made of materials having mean refractive indices differing by .087 in Examples I and II and by .115 in Example III and Abbé V numbers differing by 29 in Examples I and II and by 31 in Example III.

The divergent front member of the attachment consists in Examples I and II of a doublet having a convergent element in front of a divergent element. The rear surface is convex to the front with radius of curvature numerically equal to $.40f_{A1}$ in both examples, $f_{A1}$ being the equivalent focal length of this front member. The internal contact surface is concave to the front with radius of curvature numerically equal to $.93f_{A1}$ in both examples. The two elements are made of materials having mean refractive indices differing by .181 and Abbé V numbers differing by 30 in both examples.

The divergent front member in Example III consists of a simple component in front of a doublet component, the two components both being of meniscus form with their air-exposed surfaces convex to the front and being separated by an air space numerically equal to $.075f_{A1}$. The doublet component has a convergent element in front of a divergent element. Its rear surface is convex to the front with radius of curvature numerically equal to $.47f_{A1}$, and its internal contact surface is concave to the front with radius of curvature numerically equal to $2.32f_{A1}$, the front surface having radius of curvature numerically equal to $1.30f_{A1}$. The axial thickness of the front element of this doublet component is numerically equal to $.09f_{A1}$. The radius of curvature of the rear surface of the front component is .43 times that of the front surface of the doublet component. The radius of curvature of the front surface of the front component is numerically equal to 1.17$f_{A1}$. The two elements of the doublet are made of materials having mean refractive indices differing by .213, and the Abbé V numbers of the materials of the two divergent elements in the front member have arithmetic mean exceeding the Abbé V number of the material of the convergent element by about 29.

The wide angle attachment in these examples has the advantages of being small and light in construction and of not introducing objectionable aberration or light absorption, since it avoids steep surface curvatures and large glass thicknesses and maintains reasonably good aberration correction, especially for distortion, notwithstanding the variations of angular field and width of beam resulting from the relative movements in the front assembly of the objective.

It is to be understood, however, that other constructions may be used for the wide angle attachment within the scope of the invention, and also that the invention is not limited to the use of an objective giving two ranges of variation of equivalent focal length.

What I claim as my invention and desire to secure by Letters Patent is:

1. A variable focal length optical length system for projecting an image of an object on to a generally rectangular image-reeciving area in a stationary image plane, comprising an objective of variable equivalent focal length having a front assembly and a rear assembly, said front assembly including members relatively movable for effecting continuous variation of the equivalent focal length of the objective within a predetermined range while maintaining the resultant image position always in the stationary image plane throughout the range, said front assembly also including members relatively movable for effecting focussing of the objective for different object distances independently of the relative movements for varying the equivalent focal length, and a substantially afocal wide angle attachment which can be placed at will in front of the objective for increasing the angular field and decreasing the effective values of the equivalent focal length of the objective in accordance with the telescopic power of the attachment without reducing the effective back focal distance of the objective, the said wide angle attachment comprising a divergent front member and a convergent rear member axially spaced behind such divergent front member, the distance between the rear nodal plane of the front member and the front nodal plane of the rear member being substantially equal to the difference between the equivalent focal length of the two members, such divergent front member comprising a doublet having a divergent element behind a convergent element whose material has a mean refractive index exceeding that of the material of the divergent element by at least 0.1, the internal contact in such doublet being concave to the front, the rear surface of such doublet being convex to the front, the convergent rear member of the attachment consisting of a doublet having a convergent element behind a divergent element made of a material whose mean refractive index exceeds that of the convergent element by between 0.05 and 0.20, the internal contact in such doublet having radius of curvature greater than $3f_{A2}$, where $f_{A2}$ is the equivalent focal length of the convergent rear member, the rear surface of such doublet being concave to the front with radius of curvature between 0.2$f_{A2}$ and 0.5$f_{A2}$ and having clear diameter between 1.0 and 1.25 times the ratio of the maximum value of the equivalent focal length of the objective to the $f$-number of the objective, the equivalent focal length $f_{A2}$ of the convergent rear member of the attachment lying between 2.5 and 5.0 times such ratio the Abbé V number of the material of the rear element of each of the doublets of the wide angle attachment exceeding that of the associated front element by at least 20.

2. A variable focal length optical system as claimed in claim 1, in which the rear assembly comprises in addition to the stationary convergent rear member, a stationary front member, and a divergent middle member adjustable from one to the other of two preset positions in which such middle member has the same conjugates, whereby in such two preset positions of the middle member the relative movement of the members of the front assembly will produce two different ranges of variation of the equivalent focal length of the objective with the same position of the resultant image plane, the magnifications of the divergent middle member of the rear assembly in its two present positions respectively being $\sqrt{M}$ and $1/\sqrt{M}$, where M is the ratio between the values of the equivalent focal lengths of the objective in the two ranges, the rear assembly having an inverted telephoto characteristic in respect of the lower of the two ranges and a telephoto characteristic in respect of the upper range.

3. A variable focal length optical system as claimed in claim 1, in which the divergent front member of the wide angle attachment consists of a single doublet component only, the difference between the mean refractive indices of the materials of the elements of such doublet lying between 0.1 and 0.25; the radius of curvature of the internal contact in such doublet lying between 0.5$f_{A1}$ and 2$f_{A1}$.

4. A variable focal length optical system as claimed in claim 1, in which the divergent front member of the wide angle attachment comprises a simple meniscus divergent component with its surfaces convex to the front and a doublet meniscus component axially spaced behind such simple component and having its air-exposed surfaces convex to the front, such doublet component having a convergent element in front of a divergent element.

5. A variable focal length optical system as claimed in claim 4, in which the front surface of the doublet component of the divergent front member of the attachment has radius of curvature greater than the equivalent focal length of such front member and less than twice such equivalent focal length, and the internal contact in such doublet component has a radius of curvature between 1.67 and 5 times such equivalent focal length, whilst the axial thickness of the front element of such doublet component lies between .05 and .15 times such equivalent focal length.

6. A variable focal length optical system as claimed in claim 5, in which the radius of curvature of the rear surface of the front component of the divergent front member of the attachment bears to that of the front surface of the doublet component of such member a ratio lying between .3 and .6, and the axial length of the air space between such surfaces lies between .05 and .15 times the equivalent focal length of such front member.

7. A variable focal length optical system as claimed in claim 6, in which the radii of curvature of the front and rear surfaces of the divergent front member of the attachment respectively lie between .75 and 1.75 and between .4 and .6 times the equivalent focal length of such front member, and the arithmetic mean of the Abbé V numbers of the materials of the divergent elements in the divergent front member of the attachment exceeds the Abbé V number of the material of the convergent element therein by at least 20, and the mean refractive index of the material of the front element of the doublet component of such front member exceeds that of the rear element of such component by at least .16.

8. A variable focal length optical system as claimed in claim 4, in which the radius of curvature of the rear surface of the front component of the divergent front member of the attachment bears to that of the front surface of the doublet component of such member a ratio lying between .3 and .6, and the axial length of the air space between suhc surfaces lies between .05 and .15 times the equivalent focal length of such front member.

9. A variable focal length optical system as claimed in claim 4, in which the radii of curvature of the front and rear surfaces of the divergent front member of the attachment respectively lie between .75 and 1.75 and between .4 and .6 times the equivalent focal length of such front member.

10. A variable focal length optical system as claimed in claim 1, in which the rear assembly of the objective includes a stationary convergent rear member having equivalent focal length $f_r$ and at least one member in front thereof which cooperates with the front assembly to form a divergent group whose equivalent focal length bears to the equivalent focal length of the complete objective a constant ratio lying between $f_r/F_0$ and $f_r/3F_0$, where $F_0$ is the minimum value of the equivalent focal length of the objective within the range of variation thereof, such divergent group acting to produce a virtual image of the object in a constant position lying between $f_r$ and $4f_r$ in front of the front surface of the said convergent rear member, whereby such rear member always receives a divergent beam.

11. A variable focal length optical system as claimed in claim 1 in which the rear surface of the doublet in the divergent front member has a radius of curvature lying numerically between $0.25f_{A1}$ and $0.6f_{A1}$ where $f_{A1}$ is the equivalent focal length of the divergent front member.

References Cited in the file of this patent

UNITED STATES PATENTS

| | | |
|---|---|---|
| 2,324,057 | Bennett | July 13, 1943 |
| 2,507,164 | Kingslake | May 9, 1950 |
| 2,582,085 | Tolle | Jan. 8, 1952 |
| 2,752,821 | Cook | July 3, 1956 |
| 2,821,110 | Cook | Jan. 28, 1958 |
| 2,913,957 | Back | Nov. 24, 1959 |